United States Patent [19]

Hernandez et al.

[11] Patent Number: 4,663,615
[45] Date of Patent: May 5, 1987

[54] DOCUMENT CREATION

[75] Inventors: Irene H. Hernandez; Rex A. McCaskill, both of Austin; Barbara A. Barker, Round Rock, all of Tex.

[73] Assignee: International Business Machines Corporation, Armonk, N.Y.

[21] Appl. No.: 686,519

[22] Filed: Dec. 26, 1984

[51] Int. Cl.[4] .............................................. G09G 1/16
[52] U.S. Cl. .................................... 340/721; 340/723; 340/724
[58] Field of Search ............... 340/721, 723, 724, 739, 340/747, 792

[56] References Cited

U.S. PATENT DOCUMENTS

| 4,258,361 | 3/1981 | Hydes et al. | 340/721 |
|---|---|---|---|
| 4,278,973 | 7/1981 | Hughes et al. | 340/721 |
| 4,533,910 | 8/1985 | Sukonick et al. | 340/721 |
| 4,542,376 | 9/1985 | Bass et al. | 340/721 |
| 4,549,275 | 10/1985 | Sukonick | 340/792 |

FOREIGN PATENT DOCUMENTS 0059349 9/1982 European Pat. Off. .
0071725 2/1983 European Pat. Off. .

OTHER PUBLICATIONS

*IBM Technical Disclosure Bulletin*, vol. 22, No. 10, Mar. 1980, pp. 4734-4737, W. R. Cain et al, "Local Scolling with a Multiple Partitioned Display".

*IBM Technical Disclosure Bulletin*, vol. 23, No. 7A, Dec. 1980, pp. 3035-3036, D. F. Bantz et al, "Overlapping Viewport Management".

*Primary Examiner*—Gerald L. Brigance
*Attorney, Agent, or Firm*—J. H. Barksdale

[57] ABSTRACT

A method of, and system for, creating a document on a real time basis and providing a view of adjoining portions of the document. A data object is specified for creating a window on a display screen and data is input into the window. When the window has been filled with data, input of additional data will result in scrolling of the data, and the data will become larger than the window. Upon completion of the data object, the input data is stored, but a windows' worth of data continues to be displayed. When another data object is specified, another window is created on the screen for input of data. The operations are the same as with the first described window. As additional windows are created, the screen will become full. When this occurs, there will be a scrolling of the windows. As each data object is built, it is linked to the preceding data object. Upon completion of input to a window, the window is linked to a preceding window and to the data input into the window.

6 Claims, 9 Drawing Figures

DOCUMENT CREATION

CROSS-REFERENCE TO RELATED APPLICATION

U.S. patent application Ser. No. 686,565, filed Dec. 26, 1984, entitled TAILORED DOCUMENT BUILDING, and having I. H. Hernandez et al. as inventors.

TECHNICAL FIELD

This invention relates generally to document preparation, and more specifically to a method of, and system for, aiding an operator in preparing a document.

BACKGROUND ART

Document creation utilizing application driven device controlled display standalone, or host connected, computer work stations has generally been accomplished in the text processing area by keying to a display screen. When the screen is full of text, additional keying will result in scrolling to provide room or space on the screen for additional text. As more and more text is input and scrolled, there is a tendency for an operator to forget what was keyed sometime earlier. The result is a loss of correlation between various portions of the document being created. To recover, the operator must re-refer to notes, dictation tapes, etc., or scroll back through, or reverse scroll, the keyed-in document. Although, not a mentally taxing task, it is time consuming.

Split screen facilities or application programs are available for viewing and comparing various portions of the keyed-in document. In using these facilities, one can, for example, create two view ports and cause one portion of a document to be displayed on the top half of a display screen and a different portion to be displayed on the bottom half of the screen. Side by side viewing is also possible. In addition, capabilities have been provided to further divide the screen. Commonly, on the first division the screen is divided into halves, on the second division the screen is divided into fourths, etc.

Split screen applications generally satisfy an operator's wants or needs of being able to compare one portion of a document with another. However, utilizing these applications is also time consuming and tedious.

In recent times, windowing systems or applications have become popular. Different portions of a document can be reviewed and compared, but separate windows must be created. Creating separate windows also requires operator time, effort, and attention. In addition, to meet as many operator wants or needs as possible, users have increased the applications' capability to the extent that windows can be increased or decreased in size. This can be for purposes of either magnification or increasing the size of the portion of the document being viewed.

Whether review and comparison has been by reverse scrolling, or using a split screen or windowing application, absent has been a flexible and user friendly interface for visually correlating various portions of a document during creation.

From the above, clear deficiencies exist in the prior art. These deficiencies cause the prior art to fall short of either anticipating the instant invention or rendering the instant invention obvious. More specifically, the instant invention presents an advance over prior art systems, applications, and techniques in that an operator can readily create a first window on a display screen for input of data for one portion of a document, input data larger than the window, create a second window on the screen for another portion of the document, input data larger than the second window, and so on for all portions of the document. Thus, a portion of a number of preceding portions of the document are viewable while inputting a current portion. The advantages of this advance are reduced operator attention and confusion.

DISCLOSURE OF THE INVENTION

A unique method of, and system for, creating a document are provided to improve system flexibility and user friendliness, and reduce operator attention and confusion. An operator specifies a data object and causes a window to be created on a display screen. Data is then input to the window. When another data object is specified, a window is created and displayed below the previously created window. When the screen is full and another data object is specified, the previously created windows are scrolled to make room for another window. There is no restriction on the amount of data which can be input to a window. A windows' worth of the last data input to a window remains displayed in a window when a new window is created. As such, an operator can visually correlate various portions of a document during creation.

BEST MODE FOR CARRYING OUT THE INVENTION

General Overview and Definitions

Figure 1:
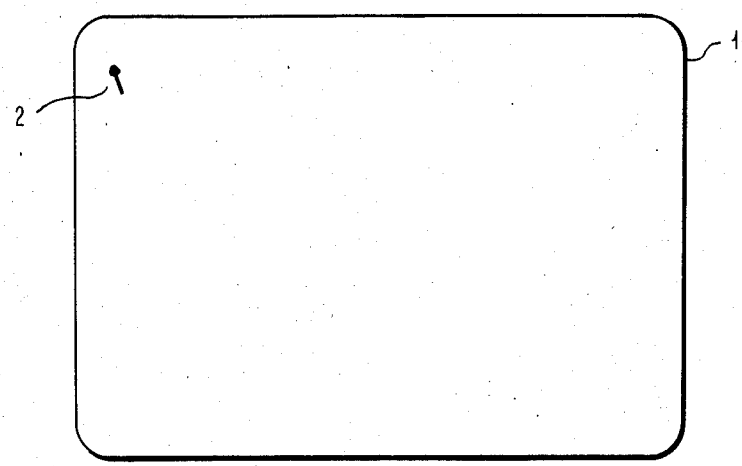
FIG. 1 illustrates an empty screen with a cursor positioned to denote the location for a data object to be created.

As a preferred embodiment, the instant invention will be packaged as, or included in, an application program. For purposes of conciseness, application program will be abbreviated to application hereinafter. The application will have been written by a user or programmer for use in either a word processing or computing system operable by an operator. The systems contemplated include standalone and host connected device controlled display workstations. The system display will preferably be of an all-points-addressable (APA) cathode ray tube (CRT) type. The face of the display will be referred to as a screen. When a window is created, only a portion of the screen will be occupied by the window which will generally be bordered. When created, a window of default size will be presented to the operator. The window can thereafter be moved, and either enlarged or diminished in size. As a practical matter, the window can be varied in size from very small up to a point that it fills the entire screen. Window manipulation in terms of locating and sizing on the screen, as broad concepts, are well known and form no part of the instant invention. The term document is meant to include storable and retrievable information. The information can be in the form of text, graphics, tables, etc.

Device control includes control of the display by a keyboard, joy stick, light pen, mouse, scratch pad, etc., or any combination of such devices. By system control is meant hardware and/or software control of a workstation.

At the beginning of operation for document creation, a menu will be presented to the operator. The operator can select a graphic object, table, etc., along with other parameters such as margins settings, etc., by keying to the menu. Keying to the menu results in a data object being defined or specified. Upon completion of keying to the menu, the system will cause a window to be built on the screen into which data can be input. The data input into the window can be much larger than the window. For example, if a text data object has been specified for one portion of the document to be built, the text can be several physical pages long. If so, compared to the window size, the text will be many times larger. Upon completion of input of the data object or portion of the document being built, the menu is recalled. A different data object can be specified. Upon completion of defining the new data object, the system will cause another window to be built on the screen below the previous window. Still displayed in the previous window will be the last part of the data input up to window size limitation. Ultimately, the screen will be filled with windows. When this occurs and a new data object is specified, the system will cause the windows already on the screen to be scrolled to provide room for another window.

Creation of a document according to the above provides an operator with a view of a portion of previous portions of the document.

DETAILED DESCRIPTION

For a more detailed understanding of the invention, it is to be assumed that use is of a standalone keyboard/display computing system such as an IBM Personal Computer configured with a keyboard, an APA display, a black and white monitor, a graphics adaptor, a disk drive, an operating system, a mouse, sufficient working memory, and diskettes containing an application structured according to the instant invention. Further assume the system has been powered on, etc., and that the application of this invention has been loaded and is running.

Figure 2:
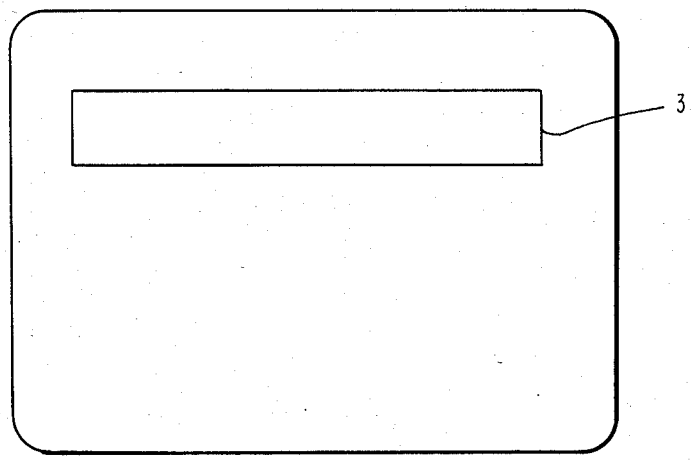
FIG. 2 illustrates an object window created at the selection location as shown in FIG. 1.

Reference is now made to FIG. 1. In this figure there is illustrated a display screen 1. The point of operation is denoted by a cursor 2. As cursor 2 is moved by a device, the point of operation is moved. The device can be a mouse, keyboard, joystick, etc. The particular characteristics of cursor 2 are unimportant as far as this invention is concerned. That is, the cursor could instead be a standard textual type cursor. Cursor location and movement are directly related to editing. Editing encompasses insertion, deletion, replacement, etc., operations. Of course, it is to be appreciated that there are instances where editing can be accomplished independently of cursor location and motion. Cursor 2 as shown in FIG. 1 denotes the location the operator has selected for a data object to be created. When the operator requests that a data object be inserted at the location of cursor 2, the application allocates a data object window 3 as shown in FIG. 2. Window 3 denotes an input and editing area for the data object. The operator may begin creation and editing of objects within the object window.

Figure 3:
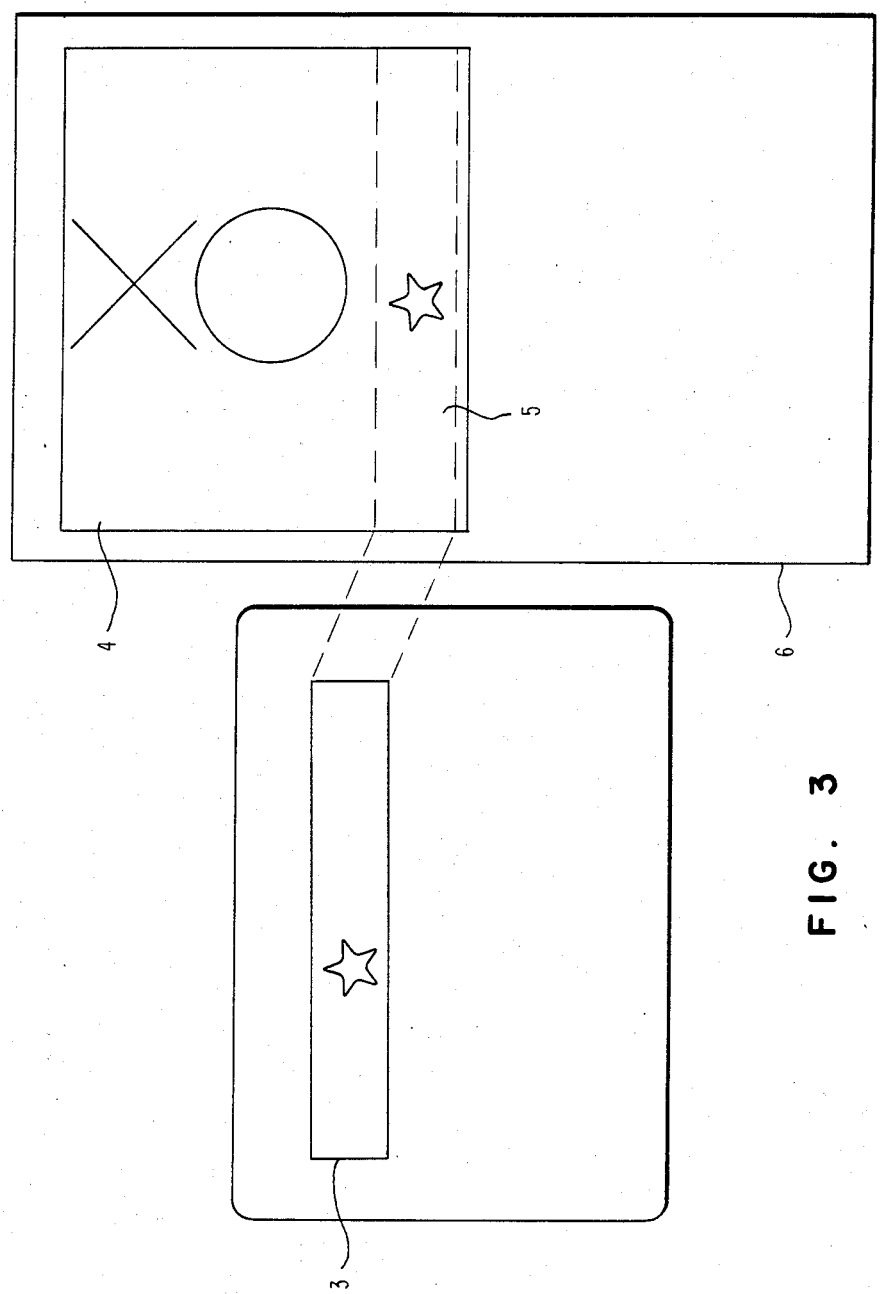
FIG. 3 illustrates a window with data and the associated data area of the object.

Reference is now made to FIG. 3. As data is entered into window 3, the created data is stored within a data area 4 in system memory or on a disk. The data area encompasses all of the data belonging to the object. This can include data not currently visible within the boundaries of the object window 3. The portion which is currently being viewed through the object window 3 is shown as portion 5. All the data in the data area is available for editing by the user. Document 6 represents the internal document structure where all the data in the data area is maintained or stored during the editing and creating processes.

Figure 4:
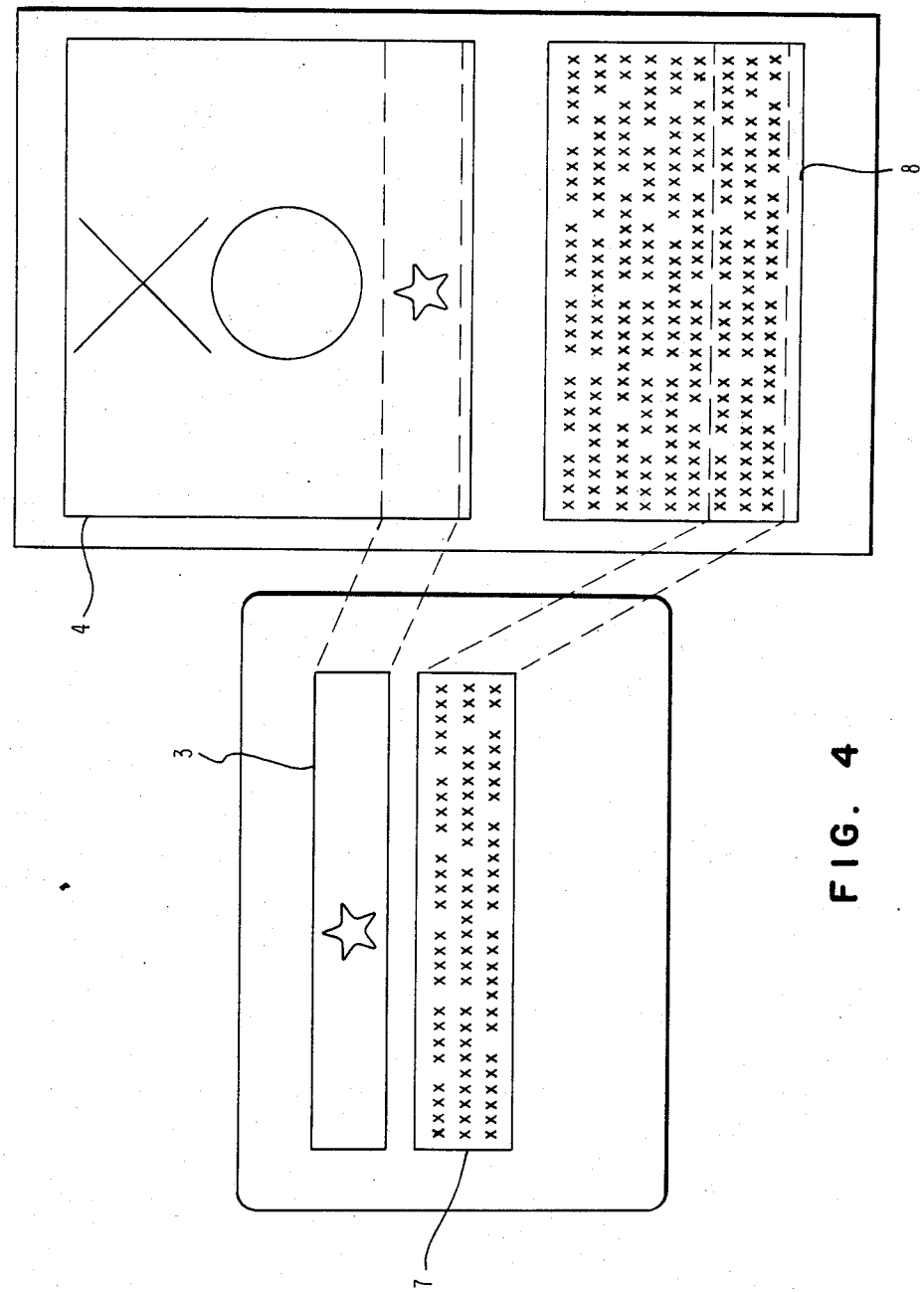
FIG. 4 illustrates the result of creating another data object within the same screen.

Referring to FIG. 4, the operator has created another object window 7 which follows object window 3. Data area 4 contains all the data for object window 3 and data area 8 contains all the data for object window 7. The order in which objects are placed within the document is dependent on the location where the operator requested the object be created.

Figure 5:
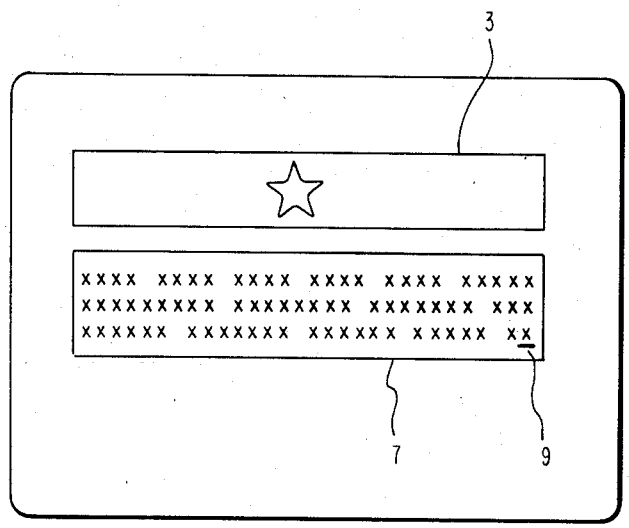
FIG. 5 illustrates a cursor reaching the boundary of a window.
Figure 6:
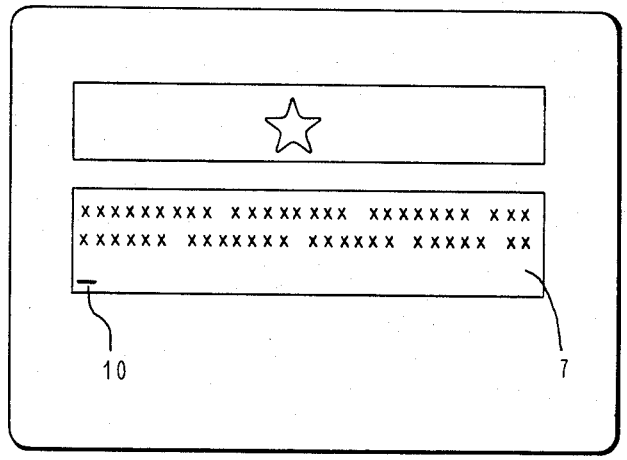
FIG. 6 illustrates a data object window being scrolled to allow more data to be entered.

Refer next to FIG. 5. Addressed now will be how the data within the object window scrolls when the boundary of the window is reached. As the operator enters data within the object window, the boundary of the window may be reached. Window 7 denotes a text window with a cursor location 9 at the lower right boundary of the window. As the operator enters the next text character within window 7, a scrolling operation will occur. The scrolling action will cause the data within the window 7 to be adjusted such that room is made for additional data. Window 7 of FIG. 6 displays the new cursor position 10 as the result of the scroll action. The size of the created object windows can be a default of such a size as to permit several windows to be displayed on the screen at the same time to view the relationship of the objects within the document.

Figure 7:
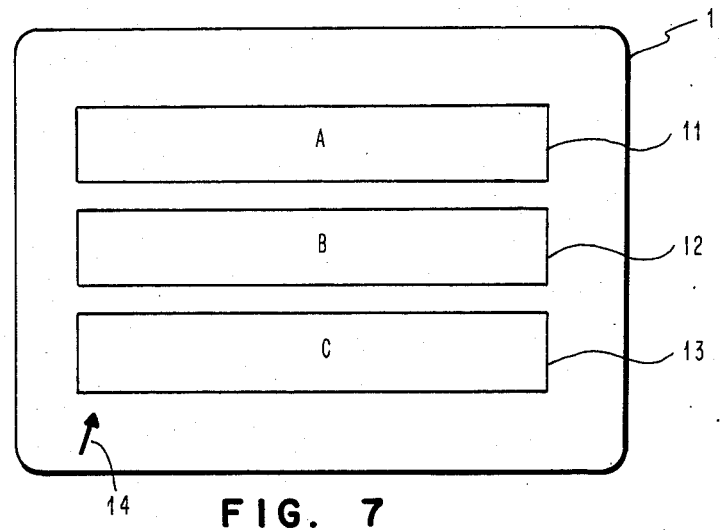
FIG. 7 illustrates a display screen when there is a request for an additional object to be created at the cursor location.
Figure 8:
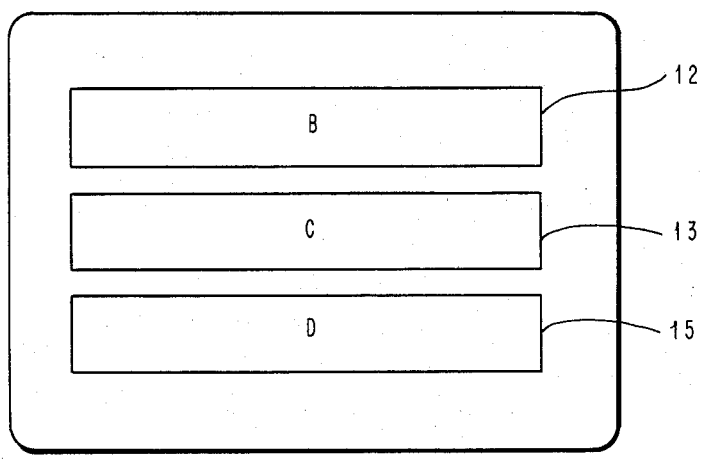
FIG. 8 illustrates how the document contents will scroll when more room is needed on the screen for another data object window.

As the operator creates additional data objects, the amount of room available on the screen becomes less and less. FIG. 7 illustrates screen 1 containing data object windows 11, 12, and 13 currently being viewed. Assume next an operator request that an additional object be created at cursor location 14. The application creates an additional object 15 as shown in FIG. 8 and inserts the object window after object 13. The addition of another object window causes the contents within the document window to be scrolled. The object window 11 of FIG. 7 scrolls out of view to make room for the new object 15 of FIG. 8. The contents being viewed within the object windows 12 and 13 are maintained. That is, as the object windows are scrolled with the document, the view of the data within the object windows do not change.

Set out below is an illustration of an application program useable by a processor in the workstation or host for creating a document according to this invention. This program is in program design language from which source and object code are derivable.

```
CALL GET_DOC_DATA (DOC_OBJECT_PTR, DOC_NAME)
CALL ALLOCATE_DOC_WINDOW (DOC_WINDOW_PTR, DOC_OBJECT_PTR)
CALL SET_DOC_VIEW(DOC_WINDOW_PTR, OBJECT_PTR)
REPEAT
CALL MONITOR_INPUT (SELECT_KEY_TYPE, X, Y)
IF ACTION_OCCURRED THEN
CASE COMMAND_TYPE OF
CREATE_OBJECT:
CALL GET_OBJECT_ATTRIBUTES(OBJECT_ATTRIBUTES)
CALL CREATE_OBJECT (OBJECT_PTR, OBJECT_ATTRIBUTES)
CALL REDISPLAY_DOC (OBJECT_PTR)
SIZE_WINDOW:
CALL SET_OBJECT_ATTRIBUTES(WINDOW_SIZE, OBJECT_PTR)
CALL REDISPLAY_DOC (OBJECT_PTR)
OTHER_ACTIONS:
CALL PROCESS_COMMAND (COMMAND_TYPE, OBJECT_PTR)
ENDCASE
ELSE
IF DATA_OBJECT_EDIT THEN
CALL GET_WINDOW_PTR(X, Y, WINDOW_PTR, DATA_AREA_PTR)
CALL GET_AREA_TYPE (DATA_AREA_PTR, AREA_TYPE)
CASE AREA_TYPE OF
DRAW_GRAPHIC: CALL_EDIT_DRAW (WINDOW_PTR, DATA_AREA_PTR)
BUS_GRAPHIC: CALL EDIT_BUS (WINDOW_PTR, DATA_AREA_PTR)
TABLE: CALL_EDIT_TABLE (WINDOW_PTR, DATA_AREA_PTR)
TEXT: CALL_EDIT_TEXT (WINDOW_PTR, DATA_AREA_PTR)
ENDCASE
ELSE
IF SCROLL_MODE THEN
CALL GET_SCROLL_MODE_TYPE (SELECT_KEY_TYPE, SCROLL_MODE_TYPE)
CASE SCROLL_MODE_TYPE OF
OBJECT_WINDOW:
CALL GET_WINDOW_PTR(X, Y, WINDOW_PTR, DATA_AREA_PTR)
CALL GET_SCROLL_AMT (WINDOW_PTR, DATA_AREA_PTR, X, Y,
SCROLL_AMT).
REPEAT
CALL SET_WINDOW_VIEW(WINDOW_PTR, DATA_AREA_PTR, SCROLL_AMT,
SCROLL_COMPLETE)
IF NOT SCROLL_COMPLETE THEN
CALL GET_DATA (OBJECT_PTR, DATA_AREA_PTR, NO_MORE_DATA)
ENDIF
UNTIL SCROLL_COMPLETE OR NO_MORE_DATA
CALL SET_CURSOR_LOCATION (WINDOW_PTR, CURSOR_LOCATION)
CALL SAVE_WINDOW_VIEW (WINDOW_PTR, OBJECT_PTR)
DOCUMENT:
CALL SET_DOC_VIEW (DOC_WINDOW_PTR, OBJECT_PTR)
ENDCASE
ENDIF
ENDIF
ENDIF
UNTIL EDIT_COMPLETE
```

When the application program initiates an editing session, a routine is called to generate the internal structure of the document (CALL GET_DOC_DATA). If a new document is being created by the operator, an empty document structure is created. If a document already exists, the structure of the document will consist of all the data objects created by the operator in a previous editing session. When the document structure is complete, the application calls a routine to allocate a 'parent' document window (CALL ALLOCATE_DOC_WINDOW) and then calls a routine to prepare the data objects to be displayed on the screen. (CALL SET_DOC_VIEW). A pointer to the object which should be displayed at the top of the screen is input to this routine. This routine traverses through the document structure looking for data objects. For each object in the structure, the routine interfaces with the windowing system to allocate a window ('a child window of the parent') and a data area. The data area is a buffer which contains all the information pertaining to a data object. The routine translates the object data into the data area. The allocated window is of a fixed size defined by the operator or system at the time the object was edited last. The allocated window may also be smaller than the data in the object's data area. A link is maintained between the data object and its respective window and data area. Information about the positions of the objects on the page are also maintained. This routine will translate enough data objects necessary to generate a screen full of information. When all translation necessary has occurred, the routine displays the data on the physical screen. The application, upon completion of displaying the document, enters a state in which the movement of the pointing cursor is being monitored for editing purposes.

As the application monitors input from the operator (CALL MONITOR_INPUT) several operator actions may occur. If an action occurred (e.g., move, copy, delete), the application calls a routine to process the command (CALL PROCESS_COMMAND). If the operator specifies that a data object is to be created, the application gets the data object's attributes such as window height and margins by calling a routine (CALL GET_OBJECT_ATTRIBUTES). The application then creates a data object internally and links the data object into the document structure. The placement of the created data object within the document structure is dependent on the selected location in the document where the operator requested the creation of the data object. The data object will be linked following the last data object at the selected location. After the data object is created, the application calls a routine (CALL REDISPLAY_DOC) to display an updated view of the document contents. This routine determines that a new object has been created, and that a window and data area do not exist for the object and will create them. The placement of the object in relation to the other objects in the document are maintained.

If the operator requested that the size of the data object's window be adjusted (either increased or decreased), the application calls a routine to set the window attributes of the selected data object in the document structure (CALL SET_OBJECT_ATTRIBUTES). The application then calls a routine (CALL REDISPLAY_DOC) to redisplay the updated view of the document contents, and the new size of the data object's window will be reflected.

If the operator action to occur is to edit the data within the data object's window, a routine is called to determine which data object window and associated data area is to be edited (CALL GET_WINDOW_PTR). Depending on the type of data (CALL GET_AREA_TYPE) in the data object's window, a routine is called to handle the creation and editing process for the type of data. A routine (CALL EDIT_DRAW) is called if draw graphics data is to be created or edited. A routine (CALL EDIT_BUS) is called if business graphics data is to be created or edited. A routine (CALL EDIT_TABLE) is called if table data is to be created or edited. A routine (CALL EDIT_TEXT) is called if text data is to be created or edited. The edit routines are responsible for inserting the data into the objects data areas as data input occurs and for issuing a redisplay of the changed data object contents. The routines also monitor when the data has reached the window boundary so that information scrolling can occur. Upon completion of editing the data object, the application will remember the last view of the data as shown within the data object's window.

If the operator action which occurred is scrolling of the data, the application determines what type of scrolling is to occur (CALL GET_SCROLL_MODE_TYPE). If scrolling of the object's data area within the window is to occur, a routine is called to determine which data object window and associated data area is to be scrolled (CALL GET_WINDOW_PTR). A routine is then called to determine how much of the data to scroll (CALL GET_SCROLL_AMT). Once the scroll amount has been determined, a routine is called to reset the view of the data within the object's window (CALL SET_WINDOW_VIEW). If it is determined from the call to SET_WINDOW_VIEW that not enough data exists within the data area to complete the scrolling process, a routine is call (CALL GET_DATA) to fetch more data into the data area. The scrolling is complete when the specified scroll amount has been reached or no more data exists for the object (UNTIL SCROLL_COMPLETE OR NO_MORE_DATA). The cursor location is updated (CALL SET_CURSOR_LOCATION) and a routine is called (SAVE_WINDOW_VIEW) to save the current view of the data within the window. If the type of scrolling to occur is document scrolling, normal scrolling of the document (CALL SET_DOC_VIEW) will occur. The view of the data object within the data objects windows are locked and will not change as the document is scrolled. The view of the data within the object's window is remembered when the call to SAVE_WINDOW_VIEW was made as defined above. If the operator elects to terminate the editing session or scroll the data object back into view, the last view within the data object's window is what is displayed.

The application continues to monitor input until the editing session is complete (UNTIL EDIT_COMPLETE). When the editing session is complete, all data within the data object's view ports are stored within the document.

Figure 9:
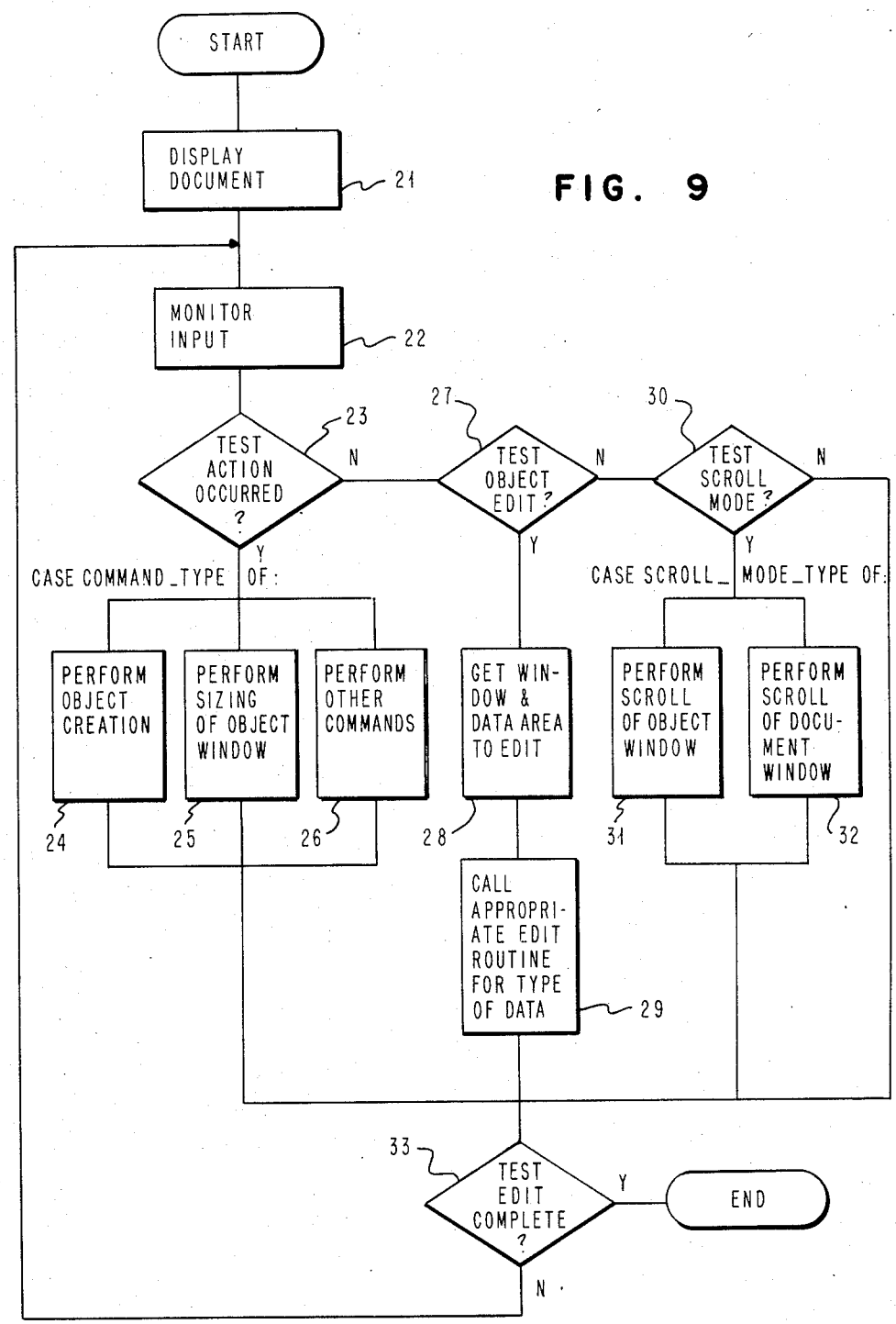
FIG. 9 is a flow chart illustrating operation performed during creation of a document according to this invention.

Reference is next made to the flow chart of FIG. 9 which illustrates operation performed in creating a document according to this invention.

First, the application initiates the editing session and invokes routines to generate the internal document structure and to display the document data as represented by block 21. Displaying the document involves creating windows and data areas for each object within the document structure. If the document did not exist previously, an empty document is displayed. If the document did exist, a screen full of data information is generated and displayed on the screen. Upon displaying the initial view of the document on the screen, the application is ready to monitor operator input as depicted in block 22. If the input received is to execute an action as shown in block 23, the application determines what type of action occurred. If the operator requested that an object be created, the application creates the data object internally, creates the data object's window, and displays the data object on the screen. The process of object creation is shown in block 24. If the operator requests that the size of the data object's window be changed (either increased or decreased), the operator specifies the new size and the application adjust the size of the object's window. The sizing of the window is shown in block 25. The application will show as much data as will fit within the new window size. If any other actions occur, the application executes those actions as shown in block 26. If an action did not occur, the application determines if object editing is to occur as shown in block 27. If object editing is to occur, the application gets information about the selected data object's window and data area as shown in block 28, and then calls the appropriate edit routine to create/edit the data as depicted in block 29. If object editing is not occurring, the application determines if a scrolling action is to occur as shown in block 30. If a scrolling action is to occur, the application determines what type of scrolling is to take place. If scrolling of the data object is to occur, the application determines the amount of data to scroll, then scrolls that amount of data within the object's window as depicted in block 31. If scrolling of the document is to occur, the application scrolls the document maintaining the view of the data within the object windows as depicted in block 32. The application continues to monitor user input until editing is complete as shown in block 33.

In summary, a unique method of, and system for, creating a document are provided to improve system flexibility and user friendliness, and reduce operator attention and confusion. An operator specifies a data object and causes a window to be created on a display screen. Data is then input to the window. When another data object is specified, a window is created and displayed below the previously created window. When the screen is full and another data object is specified, the previously created windows are scrolled to make room for another window. There is no restriction on the amount of data which can be input to a window. A windows' worth of the last data input to a window remains displayed in a window when a new window is created. As such, an operator can visually correlate various portions of a document during creation.

While the invention has been particularly shown and described with reference to a preferred embodiment, it will be understood by those skilled in the art that various changes in form and detail may be made without departing from the spirit and scope of the invention.

We claim:

1. A method of creating a document with a device controlled display computing system, said method comprising:
    (a) specifying a data object for causing said system to create a window on a screen of a display device included in said system;
    (b) inputting data for said data object and displaying input data in said window;
    (c) specifying other data objects for creating other windows on said screen for displaying input data in said other windows; and
    (d) scrolling windows displayed on said screen when additional space is needed on said screen for said other windows.

2. A claim according to claim 1 including scrolling data displayed in a window when additional space is needed in said window for input of additional data.

3. A method according to claim 1 including creating a window of default size when a data object is specified.

4. A device controlled display computing system for creating a document, said system comprising:
    (a) means for specifying a data object for causing said system to create a window on a screen of a display device included in said system;
    (b) means for inputting data for said data object and displaying input data in said window;
    (c) means for specifying other data objects for creating other windows on said screen for displaying input data in said other windows; and
    (d) means for scrolling windows displayed on said screen when additional space is needed on said screen for said other windows.

5. A system according to claim 4 including means for scrolling data displayed in a window when additional space is needed in said window for input of additional data.

6. A system according to claim 4 including means for creating a window of default size when a data object is specified.

* * * * *